(12) United States Patent
Lanchava et al.

(10) Patent No.: US 8,901,857 B2
(45) Date of Patent: Dec. 2, 2014

(54) WIRELESS SUPPLYABLE LIGHTING MODULE

(75) Inventors: Bakuri Lanchava, Regensburg (DE); Robert Kraus, Regensburg (DE); Steven Wetzel, Regensburg (DE)

(73) Assignee: Osram Gesellschaft mit beschraenkter Haftung, Munich (DE)

( * ) Notice: Subject to any disclaimer, the term of this patent is extended or adjusted under 35 U.S.C. 154(b) by 517 days.

(21) Appl. No.: 12/994,195

(22) PCT Filed: May 19, 2009

(86) PCT No.: PCT/EP2009/003556
§ 371 (c)(1),
(2), (4) Date: Mar. 4, 2011

(87) PCT Pub. No.: WO2009/141111
PCT Pub. Date: Nov. 26, 2009

(65) Prior Publication Data
US 2011/0210684 A1    Sep. 1, 2011

(30) Foreign Application Priority Data

May 23, 2008    (DE) .......................... 10 2008 024 779

(51) Int. Cl.
| | |
|---|---|
| H05B 37/02 | (2006.01) |
| F21V 23/02 | (2006.01) |
| H05B 33/08 | (2006.01) |
| F21V 21/096 | (2006.01) |
| F21Y 101/02 | (2006.01) |
| H02J 5/00 | (2006.01) |

(52) U.S. Cl.
CPC .............. *F21V 21/096* (2013.01); *Y02B 20/341* (2013.01); *F21V 23/02* (2013.01); *H05B 33/0815* (2013.01); *F21Y 2101/02* (2013.01); *H02J 5/005* (2013.01); *H05B 33/0806* (2013.01)

USPC ...................................... 315/312; 362/249.01

(58) Field of Classification Search
USPC ......... 315/212, 57, 70, 141, 142, 143, 200 R, 315/206, 213, 219, 220, 221, 222, 239, 254, 315/262, 266, 274, 276, 277, 278, 281, 282, 315/354; 257/98
See application file for complete search history.

(56) References Cited

U.S. PATENT DOCUMENTS 4,972,300 A * 11/1990 Beisswanger et al. .......... 362/34
5,034,658 A    7/1991 Hiering et al.
(Continued)

FOREIGN PATENT DOCUMENTS

| CN | 2806963 Y | 8/2006 |
|---|---|---|
| DE | 3824972 A1 | 1/1989 |

(Continued)

OTHER PUBLICATIONS

T. Sekitani et al.: "A large-area wireless power-transmission sheet using printed organic transistors and plastic MEMS switches", Nature Publishing Group, vol. 6, Jun. 2007, www.nature.com/naturematerials, pp. 413-417.

(Continued)

*Primary Examiner* — Tung X Le
*Assistant Examiner* — Jonathan Cooper

(57) ABSTRACT

A light-emitting module may include at least one receiver configured to wirelessly tap off energy from an alternating field, and at least one light source, which is connected to the receiver for tapping off electrical power, wherein the at least one light-emitting module is surrounded at least partially by a protective housing, wherein the light-emitting module is self-aligning.

23 Claims, 8 Drawing Sheets

(56) References Cited

U.S. PATENT DOCUMENTS

| | | | |
|---|---|---|---|
| 5,815,068 A * | 9/1998 | Vadseth | 340/332 |
| 7,027,311 B2 | 4/2006 | Vanderelli et al. | |
| 2005/0094395 A1* | 5/2005 | Rosenberg | 362/249 |
| 2005/0104453 A1 | 5/2005 | Vanderelli et al. | |
| 2007/0236159 A1* | 10/2007 | Beland | 315/312 |
| 2010/0028667 A1* | 2/2010 | Love | 428/339 |
| 2011/0210684 A1* | 9/2011 | Lanchava et al. | 315/312 |

FOREIGN PATENT DOCUMENTS

| | | |
|---|---|---|
| DE | 19500694 A1 | 8/1996 |
| DE | 10214195 A1 | 10/2003 |
| DE | 10239360 A1 | 3/2004 |
| DE | 102004022759 A1 | 2/2006 |
| DE | 202006003279 U1 | 6/2006 |
| EP | 1335477 A2 | 8/2003 |
| EP | 1688667 A1 | 8/2006 |
| WO | 2007008646 A2 | 1/2007 |
| WO | 2007013001 A2 | 2/2007 |
| WO | 2008012702 A1 | 1/2008 |

OTHER PUBLICATIONS

English abstract of DE 102004022759 A1.
English abstract of DE 19500694 A1.
English abstract of DE 10239360 A1.
English abstract of DE 10214195 A1.
English abstract of DE 3824972 A1.
English abstract of DE 202006003279 U1.
English abstract of EP 1688667 A1.
International Search Report of PECT/EP2009/003556 dated Feb. 23, 2010.
International Preliminary Report on Patentability.
English language abstract of CN 2806963 Y dated Aug. 16, 2006.

* cited by examiner

US 8,901,857 B2

WIRELESS SUPPLYABLE LIGHTING MODULE

RELATED APPLICATIONS

The present application is a national stage entry according to 35 U.S.C. §371 of PCT application No. PCT/EP2009/003556 filed on May 19, 2009, which claims priority from German application No.: 10 2008 024 779.0 filed on May 23, 2008.

TECHNICAL FIELD

Various embodiments relate to a light-emitting module, a light-emitting module mount and a method for producing a light-emitting device with at least one light-emitting module.

BACKGROUND

In recent years, a number of much improved light-emitting diodes (LEDs) with markedly increased luminous flux have been developed and brought to the market. They are now competitive as light-emitting means for some niches of general lighting and decorative lighting. In this case, a large number of LED lamps are often used simultaneously, which requires considerable complexity for installation and/or conversion work. In addition, nowadays a comparatively large amount of space is still required for fixing the LED lamps or LED luminaires and said lamps and luminaires are restricted to specific locations for fixing.

In particular in the case of light-emitting diodes, the electrical supply to the LEDs has until now been provided with wiring or via printed circuit board contacts in lighting applications of LEDs, usually luminaires with a traditional design. Relatively large LEDs are often supplied on a small (hexagonal) metal-core printed circuit board with half-open screw eyelets (for example by OSRAM, type designation: OSTAR LEW E3A), which can be connected in a type of lampholder. Generally, LEDs with such a design are screwed on to cooling surfaces and are connected using wires or by means similar to wires (spring contacts). Lampholders which are more suited to general lighting LEDs have not yet been standardized. Therefore, known lampholders from the incandescent lamp sector are generally used nowadays (retrofitting), although these lampholders are not optimally designed for heat dissipation, for example, and are space-consuming, and the lamps need to be fitted at a defined point.

WO 2007/008646 A2 has disclosed a general device for transferring electromagnetic energy, which has a first resonator structure which receives energy from an external power supply. The first resonator structure has a first Q factor. A second resonator structure is positioned distally from the first resonator structure and supplies an operating current to an external load. The second resonator structure has a second Q factor. The distance between the two resonators can be greater than the characteristic size of each resonator. A non-radiative energy transfer between the first resonator structure and the second resonator structure is achieved by means of coupling their resonant-field evanescent tails.

US 2005/0104453 A1 has disclosed a general device for wireless power transmission including a mechanism for receiving a radiofrequency range across a collection of frequences. The device includes a mechanism for converting the RF radiation across the collection of frequences into a DC voltage, preferably simultaneously. A method for wireless power supply includes the following steps: receiving a range of RF radiation across a collection of frequencies and converting the RF radiation across the collection of frequences into a DC voltage, preferably simultaneously.

T. Sekitani et al., "A large-area wireless power-transmission sheet using printed organic transistors and plastic MEMS switches", Nature Materials 6, 413 (2007), discloses a multilayered film which can transmit power by inductive coupling to an electrical consumer. For this purpose, it has transistors, coils and microelectromechanical systems (MEMS) consisting of conductive plastics. A laboratory sample of 50 g in weight has a size of $21 \times 21$ cm$^2$, a thickness of 1 mm and includes in total four films positioned one on top of the other, of which two are responsible for position identification of a receiver and two transmit the power. A matrix of coils with a diameter of 25 mm is printed on to one of the two films for position identification. The second film lying thereneath contains organic transistors with channel lengths of 13 µm for the logic. The combination of films which transmits the current likewise includes a film with coils and a second film with the MEMS matrix. Thanks to the coil matrix, the MEMS knows the position of the receiver and, in a targeted manner, can only allow that transmission coil to respond over which the object is located. The efficiency of the transmission is over 80 percent, and the received power increases up to 40 W in linear fashion with the output power.

SUMMARY

Various embodiments provide a possibility of particularly rapid fixing of light-emitting modules, e.g. LED light-emitting modules, which may also be spatially flexible and space-saving.

The light-emitting module has at least one receiver for wirelessly tapping off energy from an alternating field, as well as at least one light source, which is connected to the receiver for tapping off electrical power. The alternating field may be a magnetic field, for example in the case of transformer (inductive) coupling, but can also have electrical components which may or may not be used. The light-emitting module is surrounded at least partially, in particular completely, by a protective housing.

It is possible for a plurality of light-emitting modules to be accommodated in a common housing, to be precise with a common receiver or with individual receivers.

Owing to the protective housing, it is possible for the light-emitting module to be subjected to high mechanical loads or else to be used in a chemically aggressive environment. It can then be stored in particular without any particular care and brought on to a light-emitting module mount in large numbers, and therefore particularly quickly.

The protective housing can accommodate the at least one light-emitting module at least partially in a shell or else cast said light-emitting module in plastic, for example.

Preferably, at least the mechanically and/or chemically sensitive parts of the light-emitting module are surrounded by the protective housing.

It is particularly preferred for simple handling and production if the at least one light-emitting module is completely surrounded by the protective housing; in this case it is particularly preferred if the protective housing is transmissive to light, i.e. transparent or translucent (opaque), in one emission direction of the light source(s) and is permeable at least to the field transmitting the power in the region of the reception means.

When the light-emitting module or the light-emitting modules is/are only partially enveloped, it is preferred if the light-emitting module apart from the receiver, in particular the coil and/or the antenna, is surrounded by the protective housing;

the coil and/or the antenna can then be adhesively bonded or printed on an outer side of the protective housing, for example.

The energy transfer can take place in the ways described in WO 2007/008646 A2, for example. Particularly preferred is energy transfer by means of a large-area transmitter, as is described in T. Sekitani et al.

It is particularly advantageous if the light-emitting module is designed to be so robust and compact that it has bulk material capability. As a result, if required, relatively small or large quantities of LED modules can be accommodated and added to an associated light-emitting device in order to realize the desired light emission properties.

It is advantageous for effective distribution and simple alignment if the light-emitting module or the protective housing is configured such that it can be rolled, for example, is spherical or cylindrical. In the case of a cylindrical protective housing, for example when a plurality of light-emitting modules or light sources are accommodated, said light-emitting modules or light sources can be arranged in a row along the cylinder axis. In one configuration, they can have the same emission direction. Even when a plurality of light sources or light-emitting modules are present in a spherical protective housing, said light sources or light-emitting modules are arranged in a preferred configuration in such a way that they emit in the same direction.

It is further preferred if the light-emitting modules are configured individually or as a group with a reflector.

Particular preference is given to a light-emitting module which is capable of self alignment since particularly rapid application is thus made possible.

For this purpose, the light-emitting module can be equipped with a weight, for example, which shifts the center of gravity substantially from the central point. As a result, when the light-emitting modules are shaken out, in particular when using the spherical or cylindrical protective housings, said light-emitting modules are aligned along the gravitational force, in particular as a result of additional shaking of the mount.

Alternatively, the light-emitting module is equipped with at least one magnetically active element, for example a magnetic or magnetizable element. This ensures, in particular in the case of a rollable configuration, that the light-emitting module with a predefined direction can be aligned with an external magnetic field.

The self-alignment can also be achieved by the provision of a corresponding adhesion region, in particular if the light-emitting module can be rolled. The light-emitting means can then roll in particular until it remains adhered to the adhesive surface on a substrate and is aligned thereby.

For simpler application, it is further preferred if the light-emitting module is self-adhesive. It is thus possible for the light-emitting modules to be applied more quickly. The adhesion can preferably take place by means of magnetically active elements, as described above, for which purpose the light-emitting module has a magnetic or magnetizable adhesive element, or else by an adhesive strip on the outside, for example with adhesive silicone, or else one part of a hook-and-loop fastener etc.

The receiver preferably has at least one coil, which produces a corresponding voltage which can be tapped off in an alternating magnetic field.

The energy transfer from at least one transmitter to the receiver of the at least one light-emitting module can take place in one configuration by means of transformer coupling, which can have a high degree of efficiency, in particular in the case of effective coupling between the transmitter and the receiver. In this case, the at least one light source can tap off the electrical power required for its operation, for example directly via at least one coil.

In another configuration, the receiver may include a resonant circuit, in particular an LC resonant circuit. A resonant circuit typically has an associated resonant frequency, at which the power output is particularly high. The resonant coupling between two resonant circuits, in particular with a relatively high Q factor, may be preferred since, as a result, (electro)magnetic energy can be transferred with much lower coupling factors than with transformer energy transfer and the air gap can be widened from the mm range to the cm range. This has a favorable effect on the possibility of implementing accommodating areas which are fed a magnetic field. Nevertheless, the RF emission still remains very low, with the result that it can continue to be seen as a local field (near field).

In one configuration, the at least one light source can be connected electrically to the resonant circuit via an inductive or capacitive tap; alternatively directly via a center tap.

However, in general, capacitive or general electromagnetic coupling can also be used.

In accordance with one configuration, the light-emitting module has at least one light-emitting diode emitting white or colored light as light source.

In the event of the presence of a plurality of light-emitting diodes, said light-emitting diodes can emit identically colored light (in one or a plurality of colors) and/or differently colored light, for example. Thus, an LED module can have a plurality of individual LEDs ("LED clusters") which together can produce a white mixed light, for example in "cold white" or "warm white". In order to produce a white mixed light, the LED cluster preferably includes light-emitting diodes which emit in the primary colors red (R), green (G) and blue (B). In this case, individual or a plurality of colors can also be produced simultaneously by a plurality of LEDs; for example combinations RGB, RRGB, RGGB, RGBB, RGGBB etc. are possible. However, the color combination is not restricted to R, G and B (and A). In order to produce a warm-white hue, one or more amber LEDs (A) can also be provided, for example. In the case of LEDs with different colors, said LEDs can also be driven in such a way that the LED module emits in a tunable RGB color range. In order to produce a white light from a mixture of blue light with yellow light, blue LED chips provided with light-emitting means can also be used (so-called conversion LEDs), for example using surface mounting technology, for example using thin GaN technology. An LED module can also have a plurality of white individual chips, as a result of which it is possible to achieve simple scaleability of the luminous flux. The individual chips and/or the modules can be equipped with suitable optical elements for beam guidance, for example Fresnel lenses, collimators, etc. A plurality of identical or different LED modules can be arranged on one contact, for example a plurality of identical LED modules on the same substrate. Instead of or in addition to inorganic light-emitting diodes, for example on the basis of InGaN or AlInGaP, organic LEDs (OLEDs) can generally also be used.

Although in principle other type of light sources in the above light-emitting means are also conceivable, LEDs are particularly well suited to light-emitting modules, in particular encapsulated light-emitting modules. One very favorable feature of LEDs is, for example, that both the high degree of efficiency of the light source and the color temperature are largely retained even with a partial supply (dimming). Even starting processes, such as in the case of discharge lamps, for example, or threshold powers, such as in the case of incandescent lamps, for example, are practically not present in the LED. There are also no problems to be expected in terms of risk of burning or high voltage during manual handling of the LED light-emitting means and there is a high degree of safety with such a luminaire system. In addition, no wiring work is required.

In one configuration, the light-emitting module has at least two diodes connected back-to-back in parallel, at least one of which diodes is a light-emitting diode. The other light-emitting diode can likewise be a light-emitting diode, or else a non-light-emitting diode, for example, such as a Schottky diode. It is also possible for further diodes, in particular light-emitting diodes, to be connected. In general, a single light-emitting diode can also be used.

In particular, if the light source has a leadframe for making electrical contact (for example when using wired LED chips which are mounted on a common submount), it is preferred if the leadframe or a conductive strip formed thereon is used as the inductance, which is particularly space-saving.

PCB, MCPCB, flex or a ceramic (for example $Al_2O_3$) can be used as the substrate of the light-emitting module, for example.

In particular when using a light-emitting diode, a capacitance connected in parallel with the LED and/or "parasitic" capacitance of the LED itself can be used as the capacitance for the LC resonant circuit.

For improved, in particular multifrequency, power reception, the light-emitting module can be equipped with a receiver or an antenna for wirelessly tapping off the energy from the at least magnetic alternating field, possibly in accordance with U.S. Pat. No. 7,027,311.

In order to integrate elements operated on a DC voltage, it may be advantageous if a rectifier is connected downstream of the reception means for converting AC voltage generated by means of the reception means into a DC voltage, for example a full-bridge or half-bridge converter or a simple rectifier.

For fault-free operation, it is generally preferred if a capacitor with a high energy density is connected downstream of the rectifier, in particular a double-layer capacitor, also referred to as electrochemical double-layer capacitors (EDLC) or supercapacitors, such as are commercially available under the trade names Goldcap, Supercap, BoostCap or Ultracap, for example. A double-layer capacitor has the greatest energy density of all of the capacitors.

In a further configuration, a logic circuit may be provided, for example an integrated circuit such as a microcontroller, for example of the type Texas Instruments MSP 430. As a result, the light-emitting module can be equipped with intelligence in order to enable particularly flexible operation; the light sources can be controlled by the microcontroller for this purpose.

In order to maintain the supply voltage to the logic circuit at a sufficient voltage level for a sufficiently long period of time, it is preferred if a DC voltage energy store is connected upstream of the logic circuit, in particular at least one double-layer capacitor.

In one configuration, the voltage level is monitored by means of a voltage monitoring unit ("supervisor").

In order to drive the light-emitting module, said light-emitting module is preferably designed to receive and make use of wirelessly transmitted control data (for example commands) for the logic circuit.

In order to drive or address individual light-emitting modules or light-emitting module groups individually, the control data preferably have an identification part or ID code (for example a serial number), which is matched to the light-emitting module(s) to be addressed to such an extent that only a light-emitting module for which this ID code has been provided makes use of the useful load associated with the ID code. In particular this makes it possible to address a plurality of groups of light-emitting modules with in each case different ID codes separately with respect to color selection and/or luminous intensity (dimming). As a result, a light emission property of a surface equipped with these light-emitting modules or of a body containing light-emitting modules can be adjusted individually and flexibly.

The control data can be transmitted or initiated by means of remote control, for example.

The control data can be transmitted to the light-emitting module independently of the energy transfer or power transmission; it is then preferred if the light-emitting module is equipped with a dedicated control data reception device for receiving and passing on the control data to the logic circuit. For this purpose, said control data reception device is preferably also capable of decoding control data.

Alternatively, the control data can be transmitted to the receiver via the alternating field provided for power transmission, in particular by signal modulation of the carrier provided for the power transmission.

In particular in the case of transmission with the alternating field provided for power transmission, the control data can be modulated on to the carrier for example by means of ASK ("Amplitude Shift Keying"; amplitude modulation), PSK ("Phase Shift Keying"; amplitude modulation), FSK ("Frequency Shift Keying"; frequency modulation) or mixed forms thereof and can be extracted again at the light-emitting module. By way of example, the data can predetermine an adjustment of the luminous intensity by the microcontroller.

If the light-emitting module is equipped with a logic circuit, said light-emitting module is preferably designed to generate a clock signal ("Clock") from the received power signal. The carrier frequency can be used for this purpose, for example.

The light-emitting module mount is designed for fastening a plurality of light-emitting modules and has at least one accommodating surface for the light-emitting modules.

The accommodating surface has, for example, depressions for positioning the light-emitting modules, in particular in the case of light-emitting modules which are self-aligning on the basis of weight. The depressions can have a predetermined, in particular regular, pattern, for example a matrix pattern.

In order to accommodate light-emitting modules which can be aligned and/or can adhere magnetically, the accommodating surface has at least one region which is either magnetic or is magnetizable. As a result, a magnetic adhering force is produced between the accommodating surface and the light-emitting module and is sufficient for holding and/or aligning the light-emitting module in a predetermined position on the accommodating surface. For this purpose, either the light-emitting module is equipped with a magnet and the accommodating surface is magnetizable, or the accommodating surface is magnetic and a fastening element of the light-emitting module is magnetizable, or the accommodating surface has a magnetic surface and the light-emitting module has a magnetic element in the form of an adhering element. The magnetic regions can have a predetermined, in particular regular, pattern, for example a matrix pattern.

Particularly preferred is a light-emitting module mount which includes at least one, in particular flexible, magnetic film, whose magnetic surface represents an accommodating surface or part thereof. In one configuration, it is also possible for a plurality of magnetic films to be combined in order to obtain an enlarged accommodating surface. The magnetic film is therefore preferably extendable. Preferred is a magnetic film with a polymer matrix. A surprising property of the flexible magnetic film is that it does not demonstrate a shielding effect with respect to electromagnetic radiofrequency fields, for example at a frequency of 500 kHz. The supply to the light-emitting means by means of local radiofrequency fields is therefore not impeded. Even cladding of the accommodating surface with a flexible magnetic film over the entire area is therefore possible. In addition, the magnetic film makes it possible for the light-emitting means to be positioned virtually as desired and is hardly sensitive to contamination at all.

A commercially available flexible magnetic film with a material thickness of 1.68 mm, for example, develops weakly adequate holding forces with respect to ferrite material, strong holding forces with respect to adhesion magnets or a physically identical flexible magnetic film, i.e. is very well suited as a material for the accommodating surface. The magnetic film therefore preferably has a thickness of from 1 mm to 2.5 mm in order to achieve a low weight and flexibility with at the same time sufficient adhesion performance.

The at least one transmitter is then preferably fitted on a surface of the magnetic film which is opposite the accommodating surface.

Alternatively, a predetermined, in particular regular, pattern of adhesion regions, for example hook-and-loop fastening regions or adhesive regions, can be provided. Preferably, the light-emitting module mount has one or more transmitters for producing at least magnetic coupling between the transmitter and the light-emitting means for energy transfer, i.e. for producing an alternating field which is matched to the receiver of the light-emitting module, in particular for resonant coupling. In one configuration, a plurality of transmitters can be provided flat on the light-emitting module mount for this purpose, for example on the reverse of the accommodating surface. It is preferred if a flat transmitter is provided, in particular as in accordance with Sekitani et al.

The method for producing a wirelessly feedable light-emitting device with at least one light-emitting module and at least one light-emitting module mount has at least the following steps: bulk-material-like distribution of the light-emitting modules over the light-emitting module mount, and alignment of the light-emitting modules. The alignment can be performed by means of self-alignment. The bulk-material-like distribution makes it possible for the light-emitting modules to be arranged much more quickly than individual positioning. This is particularly the case if the light-emitting modules are self-aligning on the light-emitting module mount.

In particular, the light-emitting modules can be mass-distributed on the accommodating surface, in particular by means of being thrown, tipped or tossed, for example by means of a shovel. This can optionally be followed by shaking.

In order to produce fixed light-emitting devices, a method is preferred which also has the step of casting the light-emitting modules, for example in transparent plastic.

For example, in order to apply light-emitting modules to the accommodating region, the procedure may be such that light-emitting modules are mass-distributed over the accommodating surface. In the case of self-alignment and self-adhesion, initially non-adhering light-emitting modules can then be removed, for example by the light-emitting device being tilted. In the event of an insufficient number or density of light-emitting modules, light-emitting modules can be distributed again after this. This is performed until a sufficient number of light-emitting modules has been applied to the accommodating surface. As a result of the self-alignment, these light-emitting modules also do not need to be aligned separately. This results in a particularly simple and time- and cost-saving way of providing in particular large-area light-emitting devices with a large number of light-emitting means.

Preferably, the mount surface is designed such that the light-emitting devices adhere to predetermined points or regions. Once a desired arrangement of light-emitting devices has been set, in one configuration said light-emitting devices can be cast in a transparent or translucent plastic material, including a polymer material. Then, the accommodating surface is removed, with the result that a light-emitting device in the form of a fixed block with preferably aligned light-emitting means cast therein is produced. These light-emitting means can be fed externally and wirelessly and therefore produce a flat or volumetric light-emitting device. Optionally, the light-emitting device can then further be cast on the side on which the mount surface was provided; alternatively, a special transmitter surface can be applied there which transfers energy to the light-emitting means, for example a flat inductive coupler on the basis of polymeric films, for example in accordance with Sekitani et al.

The system is in particular provided for general and decorative lighting.

In general, a high degree of flexibility in terms of the configuration of the light-emitting device is achieved since the direct connection to the current source is superfluous.

In general, the light-emitting modules are not restricted to an arrangement on a light-emitting means mount. Instead, they can also be used in the style of an aggregate in a suspension.

Thus, a flexible, three-dimensional lighting configuration can be achieved by simply applying color with embedded LED modules at specific points in three dimensions. For this purpose, the light-emitting modules are preferably not aligned, but are distributed randomly or quasi-randomly with respect to their position. For example, a transparent or diffusely scattering adhesive layer or color layer with embedded LED modules is applied to specific points on the walls of a recreation room. The protective housing is in this case in particular also provided for protecting from any chemical influences.

In the case of individual luminaires, the wattage of the luminaries can be varied by a quantity or concentration of the light-emitting module bulk material applied. For example, the luminosity of the luminaire can be varied by controlled admixture of the bulk material to the matrix. In this case, it is possible for the light-emitting modules to be aligned, but it is also possible for them not to be aligned.

The light-emitting modules can be embedded as bulk material in a flat wall, for example a partition wall, or in a 3D object, for example a sculpture, and can be applied to desired points by means of possibly localized induction for illumination purposes.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

Figure 1:
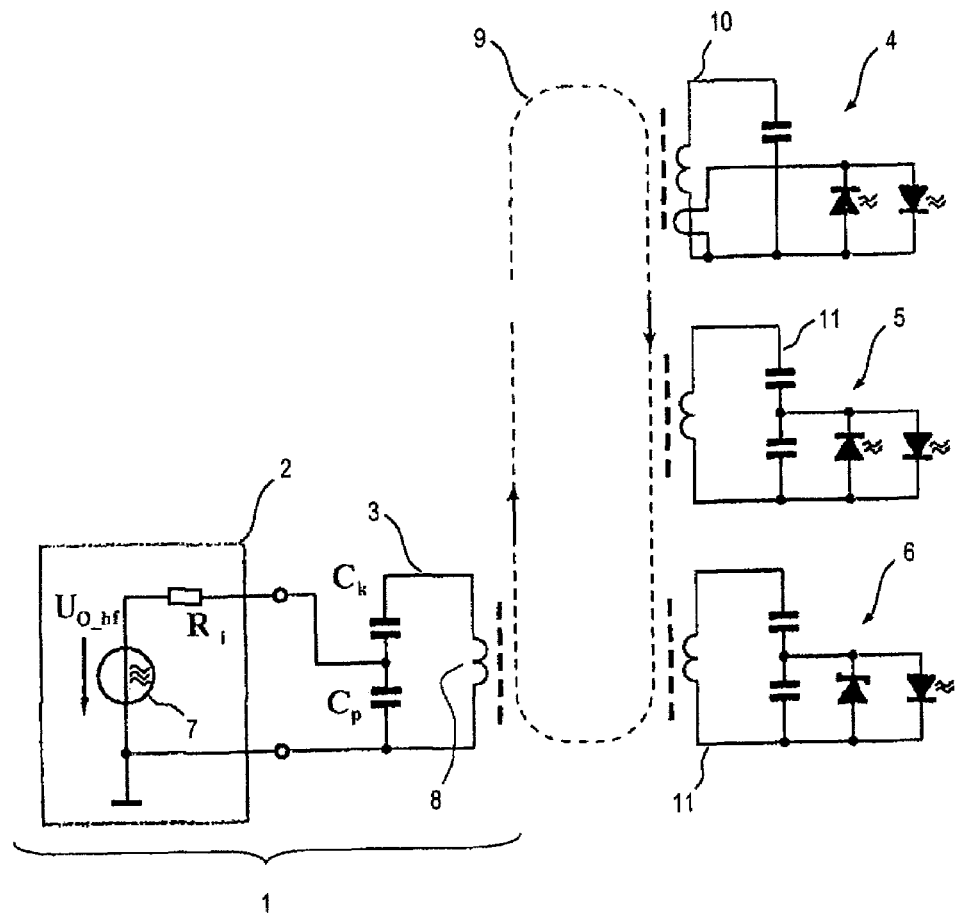
FIG. 1 shows a circuit diagram of a system comprising a light-emitting module mount and three light-emitting modules configured by way of example.

FIG. 1 shows a circuit diagram of a system including a light-emitting module mount 1 with a resonant feed circuit 2 as transmitter, which is operated by a radiofrequency source generator 3, and three light-emitting modules 4, 5, 6 configured by way of example.

The radiofrequency source generator 3 generates a radiofrequency AC voltage signal, which is fed into the resonant feed circuit 2. The resonant feed circuit 2 has two capacitors Ck and Cp and a coil 8, as is shown, wherein the radiofrequency signal is introduced via the capacitor Cp. By virtue of the AC voltage signal, a corresponding radiofrequency magnetic field 9 is induced by the coil 8.

The light-emitting means 4, 5, 6 each have a resonant circuit 10, 11 as the receiver. Specifically, the first light-emitting means 4 has a resonant circuit 10 with a coil 16 and a capacitor (without any reference symbol), wherein the resonant circuit has a predetermined resonant frequency. If the RF magnetic field 9 oscillates at the resonant frequency or close to the resonant frequency, the resonant circuit 10 is excited to a particularly considerable extent, as a result of which a power which is high in comparison with non-resonant excitation can be tapped off at the resonant circuit 10. These considerations also apply to the resonant circuit 11 of the light-emitting means 5 and 6. In the case of the first resonant circuit 10, the power is tapped off by means of inductively tapping off two light-emitting diodes (without any reference symbols) connected back-to-back in parallel for operation thereof. The light-emitting diodes illuminate alternately during a current flow in their respective forward direction. The second light-emitting means 4 has a resonant circuit 11 with a coil and two capacitors (without any reference symbols). In the case of the second resonant circuit 11, the power is tapped off by means of capacitively tapping off via one of the capacitors likewise from two light-emitting diodes (without any reference symbols) connected back-to-back in parallel for operation thereof. In this case, too, the light-emitting diodes illuminate alternatively during a current flow in their respective forward direction. The third light-emitting means 6 has a Schottky diode instead of one of the light-emitting diodes in comparison with the second light-emitting means 5. The light-emitting diode only illuminates during a current flow in its respective forward direction, but this is not perceived by the eye owing to the high frequency of the change in direction.

Feeding via resonant coupling for the exemplary embodiment shown only functions in a limited frequency band, which, on the basis of experience, is approximately 10% of the carrier frequency of the AC voltage signal used (for example +/−25 kHz in the case of a 500 kHz carrier). It is now possible to implement a time multiplexing method in which different carrier frequences in temporal sequence are used for feeding, said carrier frequencies in each case being received separately at resonance by associated light-emitting means (for example groups with different colors or different arrangement). The respective groups can therefore be driven separately. The sequence is selected in terms of time such that the eye perceives the illumination of the diode(s) to be continuous without any flicker. The light-emitting means can all have the same basic structure with a different dimensioning of the oscillating components.

Alternatively, transformer coupling is also conceivable, for example.

Figure 2:
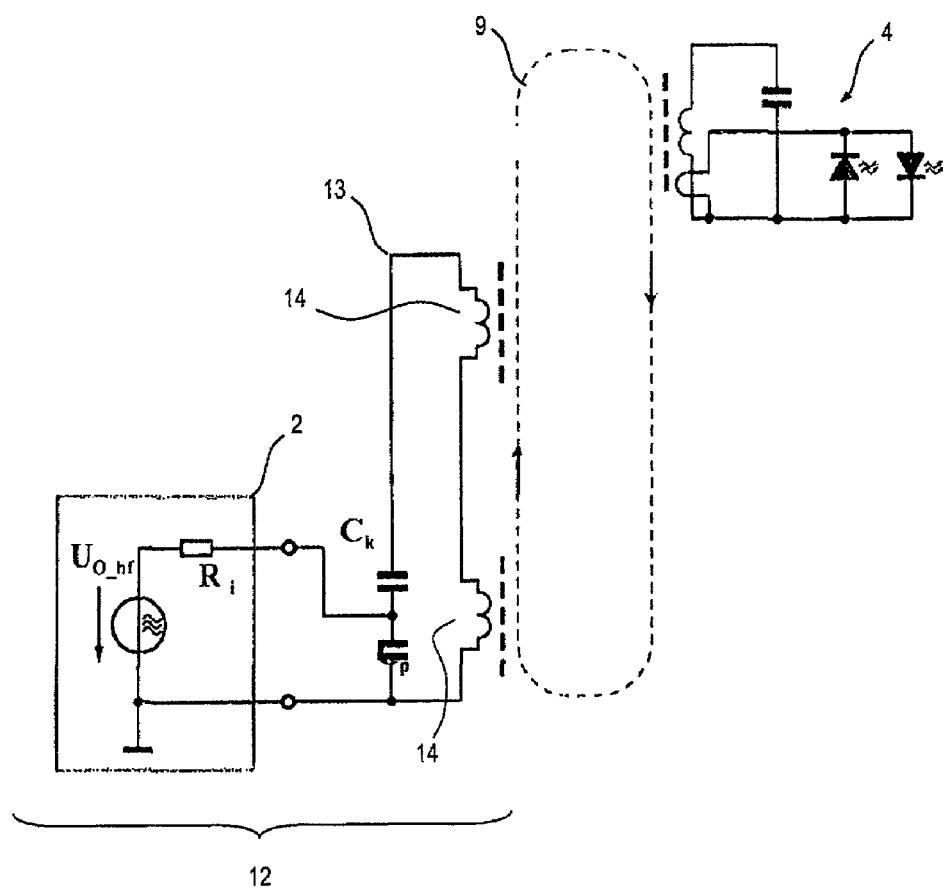
FIG. 2 shows a circuit diagram of a system comprising a further light-emitting module mount and a light-emitting means.

FIG. 2 shows a system similar to that shown in FIG. 1, wherein the light-emitting module mount 12 now has a resonant circuit 13 with two coils 14 connected in series. The two coils 14 have a lower turns number than the coil 8 shown in FIG. 1 in order to maintain the oscillatory characteristics of the resonant circuit 13. The two coils 14 can also be in the form of a double coil with two separate windings on a common core. This arrangement results in a lateral extent of the RF magnetic field 9 being increased in size (upwards in the figure shown), with the result that the light-emitting means 4 is provided with an enlarged feed region with sufficient luminous intensity.

Figure 3A:
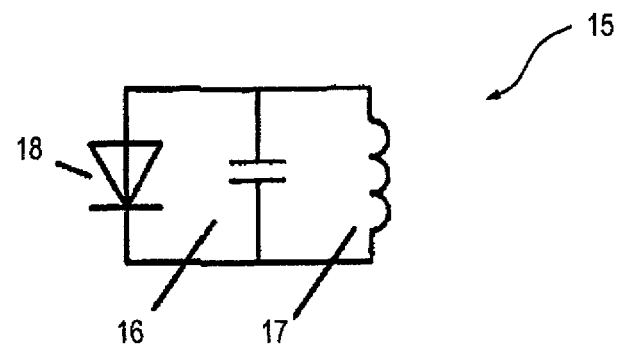
FIG. 3A shows a circuit diagram of a light-emitting module in accordance with a further embodiment.

FIG. 3A shows a basic circuit diagram of a further light-emitting module 15 for use with generally at least magnetic coupling via a corresponding alternating field. The light-emitting module 15 has a resonant circuit with a capacitor 16 and an inductance 17, which form an LC resonant circuit. The inductance 17 may be present in the form of a rectangular, planar helix, for example. A light-emitting diode 18 taps off power directly by means of a center tap between the capacitor 16 and the inductance 17. When a current flow is produced in the resonant circuit, the light-emitting diode 18 always illuminates when the current flows in its forward direction. At a sufficiently high frequency of the alternating field, the illumination of the light-emitting diode is perceived to be continuous. The light-emitting diode is representative of one or more light-emitting diodes which can be connected in series, in parallel and/or back-to-back in parallel.

Figure 3B:
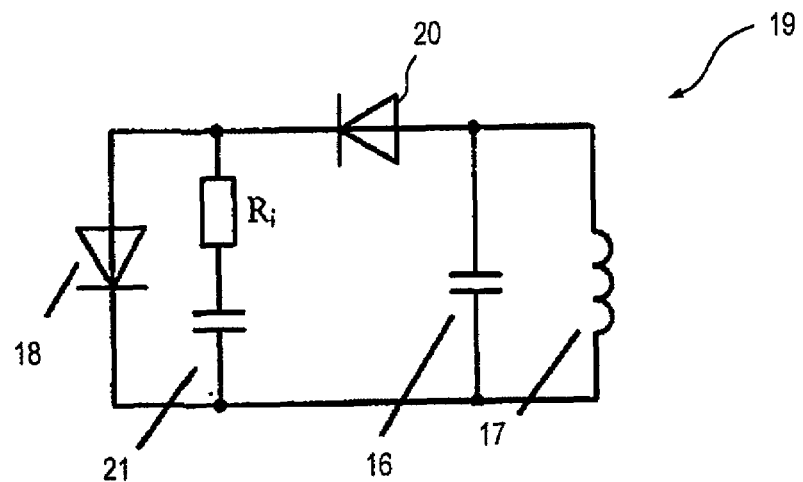
FIG. 3B shows a circuit diagram of a light-emitting module in accordance with yet a further embodiment.

FIG. 3B shows a basic circuit diagram of a further light-emitting module 19, which now has a current storage capability in contrast to the light-emitting module 15. This further light-emitting module, in addition to the light-emitting module 15 shown in FIG. 3A, has a rectifier diode 20 for current rectification which is connected between the resonant circuit 16, 17 and the light-emitting diode 18. The rectifier diode 20 can be replaced by any other suitable form of rectifier circuit, for example a Graetz circuit. A storage capacitor 21 with an internal resistance Ri is provided, connected downstream of the rectifier diode 20 and in parallel with the light-emitting diode 18. Given a sufficient power of the resonant circuit 16, 17, a current store is made available by this storage capacitor 21 for the light-emitting diode 18, with the result that flickering of the light-emitting diode 18 or even an interruption to the light-emitting operation in the case of low-frequency carrier fields or an interruption to the energy supply is reduced or prevented. The storage capacitor 21 is preferably a double-layer capacitor, which has a particularly high energy density.

Figure 4A:
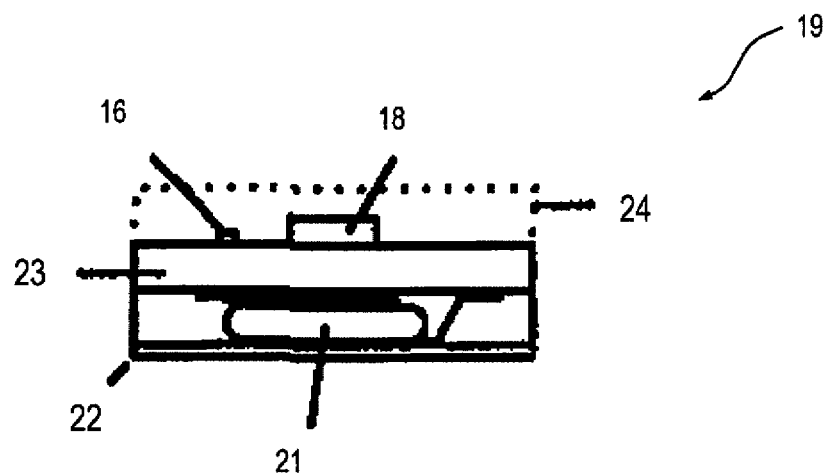
FIG. 4A shows, as a sectional illustration in a side view, a physical configuration of the light-emitting module shown in FIG. 3B.

FIG. 4A shows, in a side view, a possible physical configuration of the light-emitting module shown in FIG. 3B. First, the double-layer capacitor 21 is applied to a self-adhesive support 22 and in turn supports a substrate 23, wherein the LED 18, the capacitor 16 and the inductance (not shown) are applied to that side of the substrate 23 which is opposite the double-layer capacitor 21. This light-emitting means 19 is surrounded by a protective housing 24 apart from the self-adhesive outer side of the adhesive tape 22, the upper part of said protective housing 24 being transmissive to light in the region of the light-emitting diode 18, as is indicated by the dotted line.

Figure 4B:
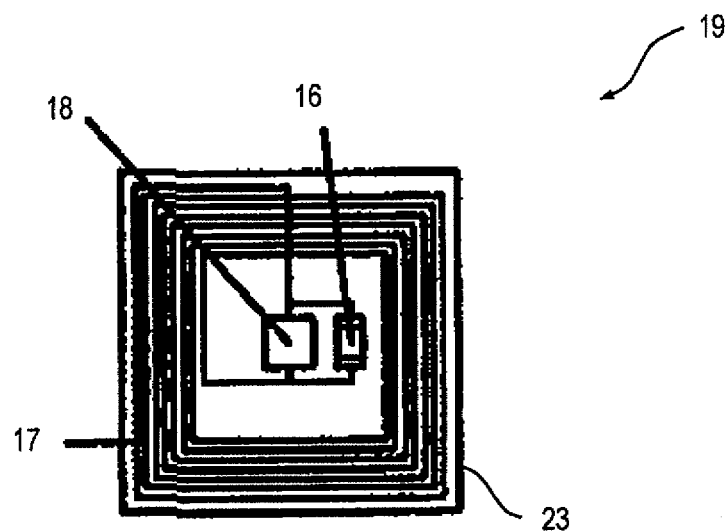
FIG. 4B shows, in plan view, the light-emitting module shown in FIG. 4A.

FIG. 4B shows the substrate 23 in a plan view with the light-emitting diode 18, capacitor 16 and rectangular, planar helix as inductance 17 applied thereto. The encapsulated light-emitting module 19 therefore has a disc shape in the form of a square.

Figure 5:
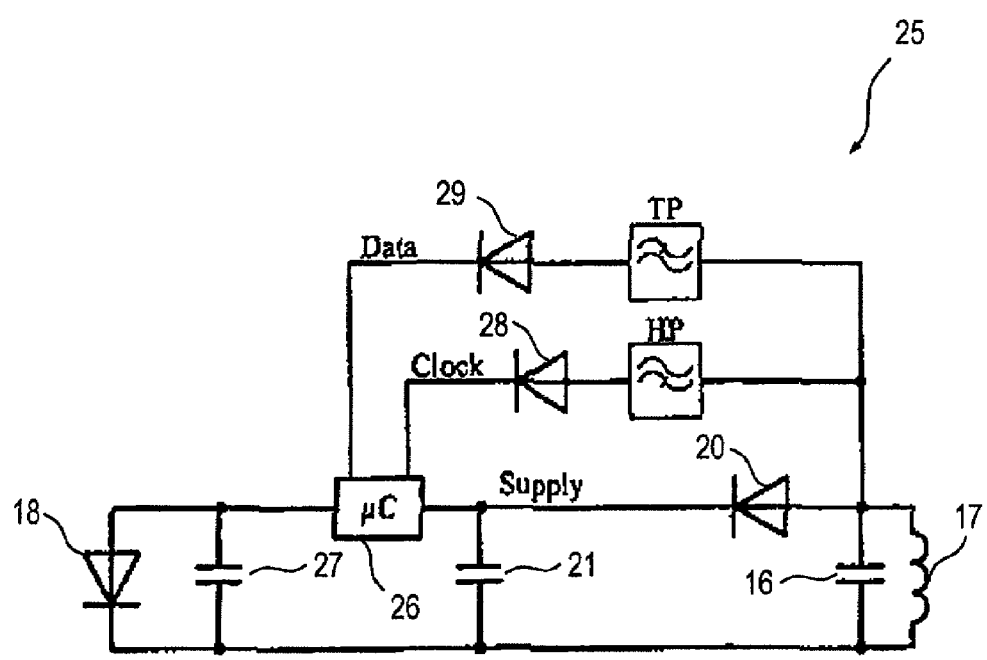
FIG. 5 shows a circuit diagram of a light-emitting module in accordance with a further embodiment with a microcontroller.

FIG. 5 shows a basic circuit diagram of a light-emitting module 25, which, in contrast to the light-emitting module 19 shown in FIG. 3B, now has a logic circuit 26 in the form of a microcontroller of the type NSP430 by Texas Instruments. The microcontroller 26 is introduced into the current path to the light-emitting diode 18 downstream of the double-layer capacitor 21, with the result that current can also be supplied to said microcontroller from the double-layer capacitor 21 ("supply") and at the same time said microcontroller can control a supply of current to the light-emitting diode 18. A buffer capacitor 27 for bridging the light-emitting diode 18 is also connected, in parallel with the light-emitting diode 18, downstream of the microcontroller 26. In order to supply a clock signal ("Clock") to the microcontroller 26, a further electrical branch is tapped off from the resonant circuit 16, 17 and leads to a clock input of the microprocessor 26 and has a high-pass filter HP and, downstream thereof, a demodulator diode 28. As a result, the carrier frequency of the feed signal can be used as clock frequency, for example; in order to match the clock signal Clock, a frequency divider can also be used. Furthermore, a data path to a data input of the microcontroller 26 branches off from the resonant circuit 16, 17, said data path having a low-pass filter TP, followed by a demodulator diode 29. Control signals ("data") which have been modulated on to the power signal can be filtered out via this data path and made available to the microprocessor 26. A light-emitting means can therefore be operated by a microprocessor 26 via a single reception part 16, 17. Possible control data transmission methods are, for example, ASK ("amplitude shift keying"; amplitude modulation), FSK ("frequency shift keying"; frequency modulation), PSK ("phase shift keying"; phase modulation) and methods derived therefrom and combinations of these methods. The fundamental or carrier frequency of the power signal can therefore determine the clock for the microcontroller 26, and the modulated oscillation can transmit the control information (commands) for the microcontroller 26. The rectification of the fundamental or carrier frequency produces the supply voltage for the microcontroller 26. A current intensity which is to be supplied to the light-emitting diode 18 and can be used for dimming the light-emitting diode 18 can be used as control data, for example. The microcontroller therefore in particular acts as a driver. In another configuration in which the light-emitting diode 18 has a cluster including a plurality of different colored LED chips which are applied to a common submount, a current intensity can be assigned to selectively individual colors by the control signals Data, with the result that a predetermined change in color of the LED cluster is possible.

Figure 6:
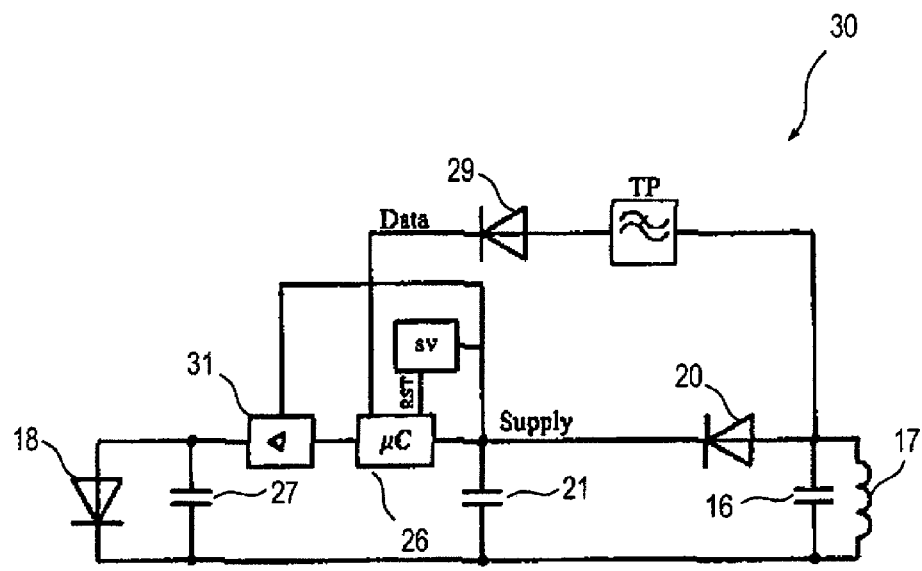
FIG. 6 shows a circuit diagram of a light-emitting module in accordance with yet a further embodiment with a microcontroller.

FIG. 6 shows a basic circuit diagram of a further light-emitting module 30, in which a further external voltage monitoring device SV is now provided, which is likewise fed from the supply line. The voltage monitoring device enables the microcontroller 26 via a reset line RST if a sufficient voltage level is present. This improves continuous operation of the light-emitting module 30. In addition, the light-emitting module 30 now has an external driver 31, which is controlled by the microcontroller 26. The LED 18 can be driven more precisely and at a higher current by means of the external driver 31.

Figure 7:
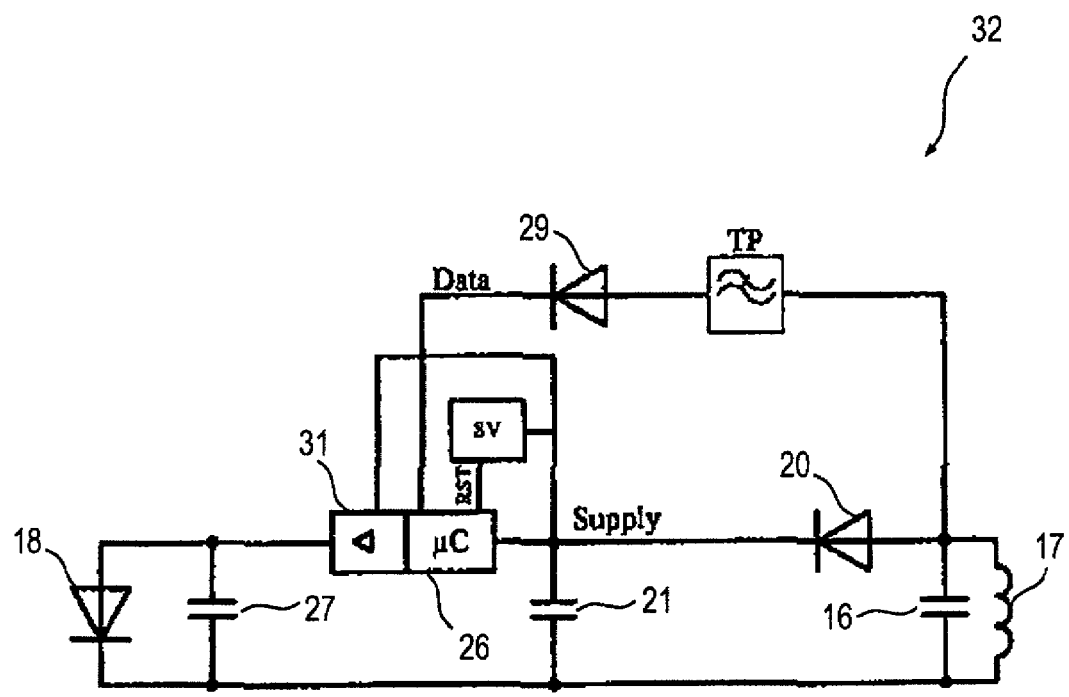
FIG. 7 shows a circuit diagram of a light-emitting module in accordance with yet a further embodiment with a microcontroller.

FIG. 7 shows a light-emitting module 32 in accordance with yet a further configuration in which the driver 31 is now integrated in the microcontroller 26, which saves on components.

The light-emitting modules 25, 30 and 32 shown in FIGS. 5 to 7 are designed to be remote-controlled by control commands. As a result, a luminous intensity and/or a color selection may be controlled, for example. The light-emitting modules 25, 30 and 32 may also have a dedicated antenna (not shown), as an alternative to the reception of the control data.

Figure 8:
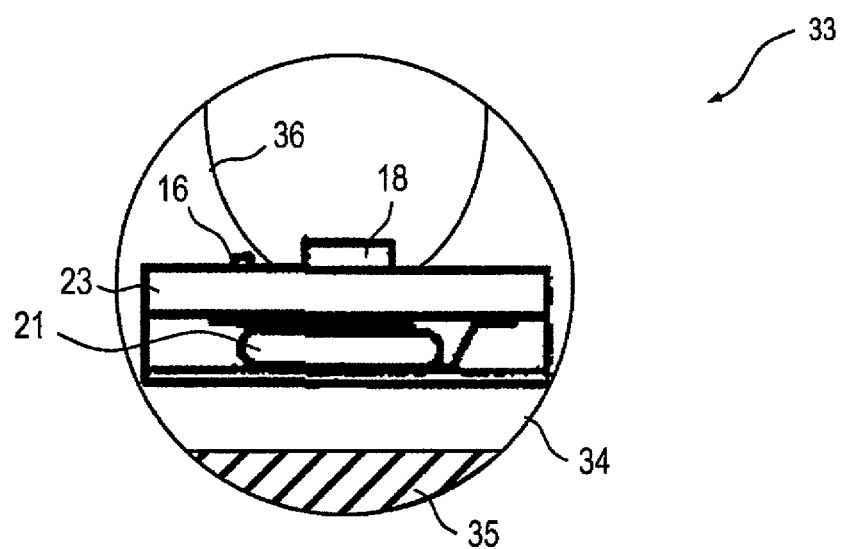
FIG. 8 shows, as a sectional illustration in a side view, a physical configuration of a further light-emitting module.

FIG. 8 shows, as a sectional illustration in a side view, a light-emitting module 33, which is now completely encapsulated in a protective housing 34. To improve distribution capacity, the housing 34 has a substantially spherical outer contour and surrounds a magnet 35 in a lower region for self-adhesion and self-alignment. The light-emitting diode 18 is surrounded by a reflector 36 laterally to form the rays.

The present invention is of course not restricted to the exemplary embodiments shown.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

LIST OF REFERENCE SYMBOLS

1 Light-emitting module mount
2 Resonant feed circuit
3 Source generator
4 Light-emitting means
5 Light-emitting means
6 Light-emitting means
8 Coil
9 Radiofrequency magnetic field
10 Receiver resonant circuit
11 Receiver resonant circuit
12 Light-emitting module mount
13 Resonant circuit
14 Double coil
15 Light-emitting module
16 Capacitor
17 Inductance
18 Light-emitting diode
19 Light-emitting module
20 Logic circuit
21 Double-layer capacitor
22 Self-adhesive support
23 Substrate
24 Protective housing 25 Light-emitting module
26 Logic circuit
27 Buffer capacitor
28 Demodulator diode
29 Demodulator diode
30 Light-emitting module
31 Driver
32 Light-emitting module
33 Light-emitting module
34 Protective housing
35 Magnet
36 Reflector
Ck Capacitor
Cp Capacitor
HP High-pass filter
SV Voltage monitoring unit
TP Low-pass filter

The invention claimed is:

1. A light-emitting module, comprising:
a protective housing that encompasses at least one receiver,
the receiver comprising a resonant circuit having at least one inductance, and
the receiver being configured to wirelessly tap off energy from an alternating field,
wherein the alternating field is radiated through the housing, and
a support for self-alignment that is also encompassed by the protective housing, at least one light source, which is connected to the at least one receiver, and
a substrate,
wherein the support is positioned on one side of the substrate and the at least one light source is positioned on another side of the substrate, and
wherein the protective housing is self-aligning by rolling of the protective housing.

2. The light-emitting module as claimed in claim 1, which is configured such that it has bulk material capability.

3. The light-emitting module as claimed in claim 1, wherein the protective housing is configured such that the light-emitting module can be rolled.

4. The light-emitting module as claimed in claim 1, which is configured such that it is self-adhesive.

5. The light-emitting module as claimed in claim 1, wherein the receiver comprises at least one resonant circuit, wherein the at least one light source has a leadframe for making electrical contact, which leadframe acts as an inductance.

6. The light-emitting module as claimed in claim 1, further comprising: a logic circuit in the form of an integrated circuit, wherein a rectifier is interposed between the reception part and a supply terminal of the logic circuit.

7. The light-emitting module as claimed in claim 6, further comprising: a voltage monitor configured to monitor a voltage level.

8. The light-emitting module as claimed in claim 6, which is configured to receive, wirelessly, control data for the logic circuit, wherein the control data comprise at least one ID code for individually driving the light-emitting module.

9. The light-emitting module as claimed in claim 6, which is additionally equipped to generate a clock signal from a tapped-off power signal.

10. The light-emitting module as claimed in claim 1, further comprising: a reflector.

11. A light-emitting module mount for magnetically fastening a plurality of light-emitting modules, each light-emitting module comprising:
a protective housing that encompasses at least one receiver,
the receiver comprising a resonant circuit having at least one inductance, and
the receiver being configured to wirelessly tap off energy from an alternating field,
wherein the alternating field is radiated through the housing, and which is connected to the at least one receiver, and
a substrate,
wherein the support is positioned on one side of the substrate and at least one light source is positioned on another side of the substrate, and
wherein the light-emitting module is self-aligning by rolling the protective housing,
wherein the light-emitting module mount has at least one accommodating region for the light-emitting modules, and a magnetic film, whose magnetic surface forms the at least one accommodating region; and wherein the magnetic film is a flexible magnetic film with a polymer matrix.

12. A lighting device, comprising:
at least one light-emitting module mount,
wherein the light-emitting module mount has at least one accommodating region for at least one light-emitting module, and a magnetic film, whose magnetic surface forms the at least one accommodating region, and at least one light-emitting module, comprising:
a protective housing that encompasses at least one receiver,
the receiver comprising a resonant circuit having at least one inductance, and
the receiver being configured to wirelessly tap off energy from an alternating field,
wherein the alternating field is radiated through the housing, and
a support for self alignment that is also encompassed by the protective housing at least one light source, which is connected to the at least one receiver, and
a substrate,
wherein the support is positioned on one side of the substrate and the at least one light source is positioned on another side of the substrate, and
wherein the protective housing is self-aligning by rolling of the protective housing;
and wherein the magnetic film is a flexible magnetic film with a polymer matrix.

13. A method for producing a wirelessly feedable light-emitting device with at least one light-emitting module mount and at least one light-emitting module, comprising: a protective housing that encompasses at least one receiver,
the receiver comprising a resonant circuit having at least one inductance, and
the receiver being configured to wirelessly tap off energy from an alternating field,
wherein the alternating field is radiated through the housing, and
at least one light source, which is connected to the at least one receiver, and
a substrate,
wherein the support is positioned on one side of the substrate and the at least one light source is positioned on another side of the substrate, and
wherein the protective housing is self-aligning by rolling of the protective housing, the method comprising: bulk-material-like distributing the light-emitting modules over the light-emitting module mount, and align the light-emitting modules; and further comprising: shaking of the light-emitting module mount to move light-emitting modules that have not yet self-aligned.

14. The method as claimed in claim 13, further comprising: casting of the light-emitting modules.

15. The light-emitting module as claimed in claim 1, wherein
the at least one light source comprises a light-emitting diode.

16. The light-emitting module as claimed in claim 1, wherein the light-emitting module is configured to be self-aligning by being equipped with a weight which shifts to center of gravity from the central point.

17. The light-emitting module as claimed in claim 1, wherein the light-emitting module is configured to be self-aligning by being equipped with at least one magnetically active element.

18. The light-emitting module as claimed in claim 1, wherein the at least one light is fixed within the protective housing.

19. The light-emitting module as claimed in claim 1, wherein the protective housing is self-aligning by free rolling of the protective housing.

20. The light-emitting module as claimed in claim 1, wherein the protective housing is spherical.

21. The light-emitting module as claimed in claim 1, wherein the resonant circuit has at least one capacitor.

22. The light-emitting module as claimed in claim 21, wherein the capacitor is applied to the support and supports of the substrate.

23. The light-emitting module as claimed in claim 1, wherein the inductance is a planar inductance.

* * * * *